(12) United States Patent
Baek et al.

(10) Patent No.: US 7,330,332 B2
(45) Date of Patent: Feb. 12, 2008

(54) METHOD AND APPARATUS FOR HIGH-SPEED COMPENSATION OF RRO ERROR IN HARD DISK DRIVE

(75) Inventors: Sang-eun Baek, Incheon-si (KR); Chang-ik Kang, Jalu-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 12 days.

(21) Appl. No.: 11/045,496

(22) Filed: Jan. 31, 2005

(65) Prior Publication Data
US 2005/0180042 A1 Aug. 18, 2005

(30) Foreign Application Priority Data
Jan. 31, 2004 (KR) ...................... 10-2004-0006459

(51) Int. Cl.
*G11B 5/596* (2006.01)
(52) U.S. Cl. .................................................. 360/77.04
(58) Field of Classification Search ............ 360/77.04, 360/77.02, 75, 77.01, 77.05, 77.07, 77.08, 360/77.11, 78.01, 78.14
See application file for complete search history.

(56) References Cited

U.S. PATENT DOCUMENTS

| | | | | |
|---|---|---|---|---|
| 5,886,846 A | * | 3/1999 | Pham et al. ............. | 360/78.04 |
| 6,141,175 A | * | 10/2000 | Nazarian et al. ......... | 360/77.04 |
| 6,310,742 B1 | * | 10/2001 | Nazarian et al. ......... | 360/77.04 |
| 6,377,417 B1 | * | 4/2002 | Ahn ........................ | 360/77.04 |
| 6,587,302 B2 | * | 7/2003 | Ahn ........................ | 360/77.04 |
| 6,847,502 B1 | * | 1/2005 | Codilian .................. | 360/77.04 |
| 6,853,511 B2 | * | 2/2005 | Seng et al. .............. | 360/77.02 |

\* cited by examiner

*Primary Examiner*—Fred F. Tzeng
(74) *Attorney, Agent, or Firm*—Sughrue Mion, PLLC

(57) ABSTRACT

There are provided a method and apparatus for high-speed compensating repeatable run-out in a hard disk drive. The method includes a) obtaining a value of a position error signal (PES) of the hard disk drive, the PES being a relative position signal of the head with respect to the center of the target track of the disk; b) determining whether the head is in the settling mode; c) if the head is in the settling mode, compensating the RRO error without feeding back the PES; and d) if the head is in the track-following mode, compensate the RRO error by feeding back the PES. Accordingly, an excessive RRO error is compensated. Even though the hard disk drive receives an external shock or is assembled in an offline servo writing manner, the performance of the hard disk drive does not deteriorate.

17 Claims, 12 Drawing Sheets

PRIOR ART

PRIOR ART

PRIOR ART

US 7,330,332 B2

METHOD AND APPARATUS FOR HIGH-SPEED COMPENSATION OF RRO ERROR IN HARD DISK DRIVE

BACKGROUND OF THE INVENTION

This application claims the priority of Korean Patent Application No. 10-2004-0006459, filed on Jan. 31, 2004, in the Korean Intellectual Property Office, the disclosure of which is incorporated herein in its entirety by reference.

1. Field of the Invention

The present invention relates to a compensation of an error in a hard disk drive, and more particularly, to a method and apparatus for high-speed compensation of a repeatable run-out (RRO) error in a hard disk drive.

2. Description of the Related Art

Recently, a storage density of a hard disk drive has rapidly increased due to the development of magneto-resistive head techniques. There has been proposed, for example, a product capable of storing 80 GByte of data per disk, of which a track density is 93,000 TPI (tracks per inch) and a track width is 0.27 μm. A new product capable of storing 120 GByte of data per disk is expected to be developed soon. In a technique for precisely controlling a head position, it is required that the head precisely writes/reads data in/from such a fine track.

To accurately control the head position in the hard disk drive, the head must quickly move to a target track and be positioned over a center of the target track even, if there is an error. If an external shock is applied to the hard disk drive or a fastening state of a disk is not perfect during a manufacturing process thereof, a repeatable run-out (RRO) error appears, by which a track center of the disk is offset from a rotation center of the disk. The RRO error deteriorates a controlling performance of the head position. In particular, the RRO is severely generated when an offline servo writing method is used to implement servo writing to the disk before the disk is fastened to the hard disk drive. For example, when a hard disk drive having a track density of 93,000 TPI is assembled using the offline servo writing method, an RRO error of above 200 tracks is expected. It is necessary to compensate the excessive RRO error, since this remarkably deteriorates the performance of the hard disk drive at high operating speeds.

FIG. 1 is a block diagram of a conventional apparatus for compensating the RRO error in a hard disk drive. Referring to FIG. 1, an RRO compensator 110 is connected in parallel to a state feedback controller 130 to compensate the RRO error. The RRO compensator 110 is a secondary filter having an infinite gain at an RRO frequency, and a position error signal (PES) converges to zero, after a predetermined time. In order to improve a convergence speed of the RRO compensator 110, the RRO compensator is initialized to a value of a normal state when the compensator starts operating. A period of time of above 20 msec is required until the compensation is implemented, because of mutual interference of the RRO compensator 110 and the state feedback controller 130. Therefore, there is a problem in that the performance of the hard disk drive is significantly deteriorated.

SUMMARY OF THE INVENTION

The present invention provides a method and apparatus for high-speed compensation of a repeatable run-out (RRO) error in a hard disk drive.

Also, the present invention provides a computer-readable storage medium having recorded thereon a computer program for executing the above method.

According to an aspect of the present invention, there is provided a method for high-speed compensation of an RRO error in a hard disk drive, in which a head position control of the hard disk drive includes a track seeking mode where the head is moved from a current track to a vicinity of a target track, a settling mode where the head is safely guided from the vicinity of the target track to a track center, and a track-following mode where the head is maintained to be located in a center of the target track, the method comprising: a) obtaining a value of a position error signal (PES) of the hard disk drive, in which the PES being a relative position signal of the head with respect to the center of the target track of a disk; b) determining whether the head is in the settling mode; c) if the head is in the settling mode, compensating the RRO without feeding back the PES; and d) if the head is in the track-following mode, feeding back the PES to compensate the RRO.

The operation b) may comprise: calculating an estimated value of the hard disk drive; calculating a state feedback control value using the estimated state value; and determining whether the head is in the settling mode using the state feedback control value.

The operation c) may comprise: if the head is in the settling mode, determining whether a servo sector is a first sector; if the servo sector is the first sector, initializing an RRO compensation value to an initial RRO value in an RRO table and calculating the RRO compensation value; if the servo sector is not the first section, calculating a the RRO compensation value with reference to an RRO compensation value of a previous sector; and adding the RRO compensation value to a state feedback control value and outputting an addition result to a DAC.

The operation d) may comprise: if the head is in the track-following mode, feeding back the PES; calculating an RRO compensation value; adding the RRO compensation value to a state feedback control value to output the result to a DAC; and performing RRO calibration.

According to another aspect of the present invention, there is provided an apparatus for high-speed compensation of an RRO error in a hard disk drive, in which a head position control of the hard disk drive includes a track seeking mode where the head is moved from a current track to a vicinity of a target track, a settling mode where the head is safely guided from the vicinity of the target track to a track center, and a track-following mode where the head is maintained in a center of the target track, the apparatus comprising: an RRO table for storing RRO values of servo sectors of a disk; a VCM actuator for controlling a position of a head, and outputting a position error signal (PES) using a difference between a state feedback control signal of a state feedback controller and an RRO compensation value of an RRO compensator; a feedback switch for preventing the PES outputted from the VCM actuator from being inputted to the RRO compensator in the settling mode and the track seeking mode and for inputting the PES to the RRO compensator in the track-following mode; the RRO compensator for receiving the PES controlled by the feedback switch with reference to the initial RRO value of the RRO table, to compensate the RRO error; the state feedback controller for outputting the state feedback control value depending upon a state of the hard disk drive that is estimated by a state estimator; and the state estimator for receiving the state feedback control value of the state feedback controller and the PES of the VCM actuator to estimate the state of the hard disk drive.

The RRO compensator may receive the PES controlled by the feedback switch with reference to the Initial RRO value in the RRO table, to compensate the RRO error consisting of a number of harmonics. A plurality of RRO compensators may be provided to compensate each harmonic of the RRO error. The plurality of RRO compensators may be connected in parallel to each other. A gain of each of the RRO compensators connected in parallel is obtained by determining a gain of each of the RRO compensators using a transfer function for the RRO compensators connected in series and transforming said transfer function to a transfer function for the RRO compensators connected in parallel. The RRO compensator may start operating in the settling mode, and be initialized to a value stored in the RRO table to compensate the RRO error.

According to another aspect of the present invention, there is provided a computer-readable storage medium having recorded thereon a computer program for executing the above method.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Reference will now be made in detail to a method and apparatus for high-speed compensation of a repeatable run-out error (RRO) in a hard disk drive according to an embodiment of the present invention.

Figure 1:
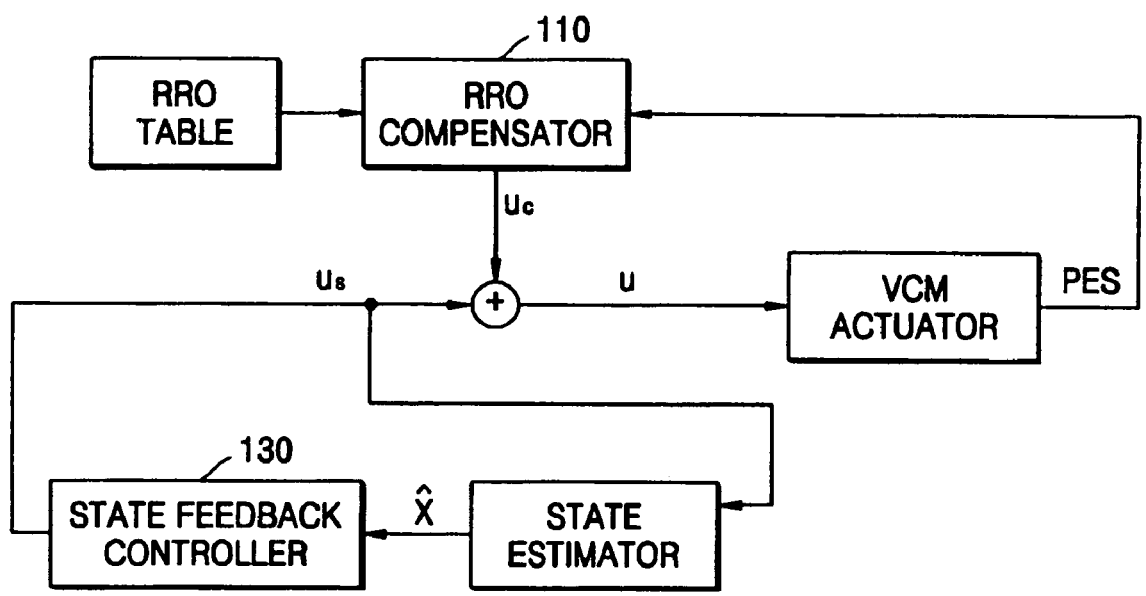
FIG. 1 is a block diagram of a conventional apparatus for compensation of an RRO error in a hard disk drive.
Figure 2:
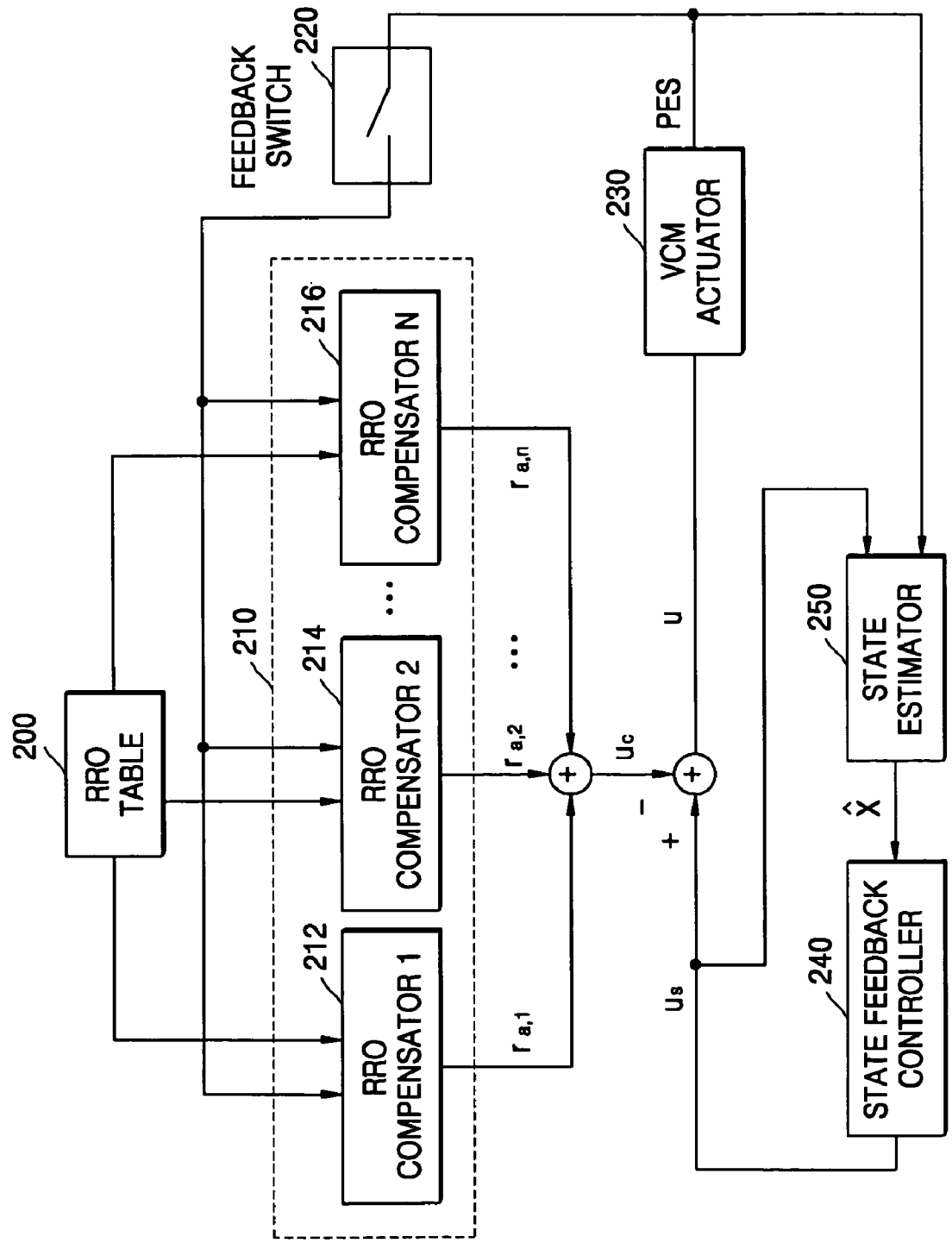
FIG. 2 is a block diagram of an apparatus for compensation of an RRO error in a hard disk drive according to the present invention.

FIG. 2 shows a block diagram of a construction of an apparatus for high-speed compensation of an RRO error in a hard disk drive, according to an embodiment of the present invention. The apparatus includes: an RRO table 200, a VCM actuator 230, a feedback switch 220, an RRO compensator 210, a state feedback controller 240, and a state estimator 250.

The RRO table 200 stores RRO values of a servo sector of a disk of the hard disk drive. The VCM actuator 230 controls a position of a head, and outputs a position error signal (PES) using a difference between a state feedback control signal of the state feedback controller 240 and an RRO compensation value of the RRO compensator 210.

The feedback switch 220 does not input the PES outputted from the VCM actuator 230 to the RRO compensator 210 in a settling mode and a track seeking mode, but inputs the PES to the RRO compensator 210 in a track-following mode.

The RRO compensator 210 receives the PES controlled by the feedback switch 220 with reference to an Initial RRO value in the RRO table 220, and compensates the RRO error. In order to compensate the RRO error consisting of a number of harmonics (1×, 2×, 3×, 4×, . . . ), N RRO compensators are generally added to the state feedback controller 240 in parallel.

The state feedback controller 240 outputs a state feedback control value depending upon a state of the hard disk drive that is estimated by the state estimator 250. The state estimator 250 receives the state feedback control value of the state feedback controller 240 and the PES of the VCM actuator 230 to estimate the state of the hard disk drive.

As shown in FIG. 2, inventive aspects of the present invention include the feedback switch 220 used at an input terminal of the RRO compensator 210, and N compensators 212, 214 and 216 connected in parallel to each other to compensate for all harmonic components of the RRO error.

The reason for using the feedback switch 220 is that it excludes mutual interference between the RRO compensator 210 and the state feedback controller 240, which is a problem described in the prior art, and thereby significantly improves compensation speed.

An action where the head searches a target track to read or write data in a desired position of a disk is referred to as a "seek". Also, a process of moving the head from a current track to the vicinity of the target track is referred to as "track seeking mode". A process of safely guiding the head from the vicinity of the target track to a center of the track is referred to as "a settling mode," and a process of keeping the head in the center of the target track is referred to as "a track following mode."

In the settling mode, the feedback switch 220 is switched off, and while in the track-following mode, the feedback switch 220 is switched on. In the settling mode, each of the RRO compensators 212, 214, and 216 calculates a compensation value $r_{a,k}$ using Equation 1, without having information on the PES.

$$\begin{bmatrix} r_{a,k}(n+1) \\ r_{b,k}(n+1) \end{bmatrix} = \begin{bmatrix} \cos(k\omega_o T_S) & -\sin(k\omega_o T_S) \\ \sin(k\omega_o T_S) & \cos(k\omega_o T_S) \end{bmatrix} \begin{bmatrix} r_{a,k}(n) \\ r_{b,k}(n) \end{bmatrix}, \quad \text{Equation 1}$$

$$k = 1, 2, \cdots, N$$

The RRO compensators 212, 214, and 216 are initialized in a normal state value when the settling mode begins, and then start operating. An initialized value $r^*_{a,k}(m)$ of the RRO compensators 212, 214 and 216 is determined from a value r*$_{a,k}$(0) previously stored in the RRO table 200 and a number m of the servo sectors as shown in Equation 2:

$$\begin{bmatrix} r^*_{a,k}(m) \\ r^*_{b,k}(m) \end{bmatrix} = \begin{bmatrix} \cos(km\omega_o T_S) & -\sin(km\omega_o T_S) \\ \sin(km\omega_o T_S) & \cos(km\omega_o T_S) \end{bmatrix} \begin{bmatrix} r^*_{a,k}(0) \\ r^*_{b,k}(0) \end{bmatrix},$$
$$k = 1, 2, \cdots, N$$

Equation 2

Also, a size of a pulse is determined depending upon the PES and a speed when the settling mode begins. The compensation values $r_{a,k}$ are summed up and then outputted to a DAC with addition of pulses at the beginning time of the settling mode.

When the head enters in the track-following mode, the feedback switch is switched on, and each of the RRO compensators 212, 214 and 216 calculates the compensation values $r_{a,k}$ using the PES as shown in Equation 3. Each value is added up and then outputted to the DAC.

$$\begin{bmatrix} r_{a,k}(n+1) \\ r_{b,k}(n+1) \end{bmatrix} = \begin{bmatrix} \cos(k\omega_o T_S) & -\sin(k\omega_o T_S) \\ \sin(k\omega_o T_S) & \cos(k\omega_o T_S) \end{bmatrix}$$

$$\begin{bmatrix} r_{a,k}(n) \\ r_{b,k}(n) \end{bmatrix} + \begin{bmatrix} a_k \\ b_k \end{bmatrix} PES(n), k = 1, 2, \cdots, N$$

Equation 3

Since the RRO error may vary with time and environment, a compensation process is implemented on-line in the track-following mode, by which the RRO compensation value r*$_{a,k}$(0) is measured when the head passes the servo sector 0, and the measured value is stored in the RRO table 200.

Figure 3A:
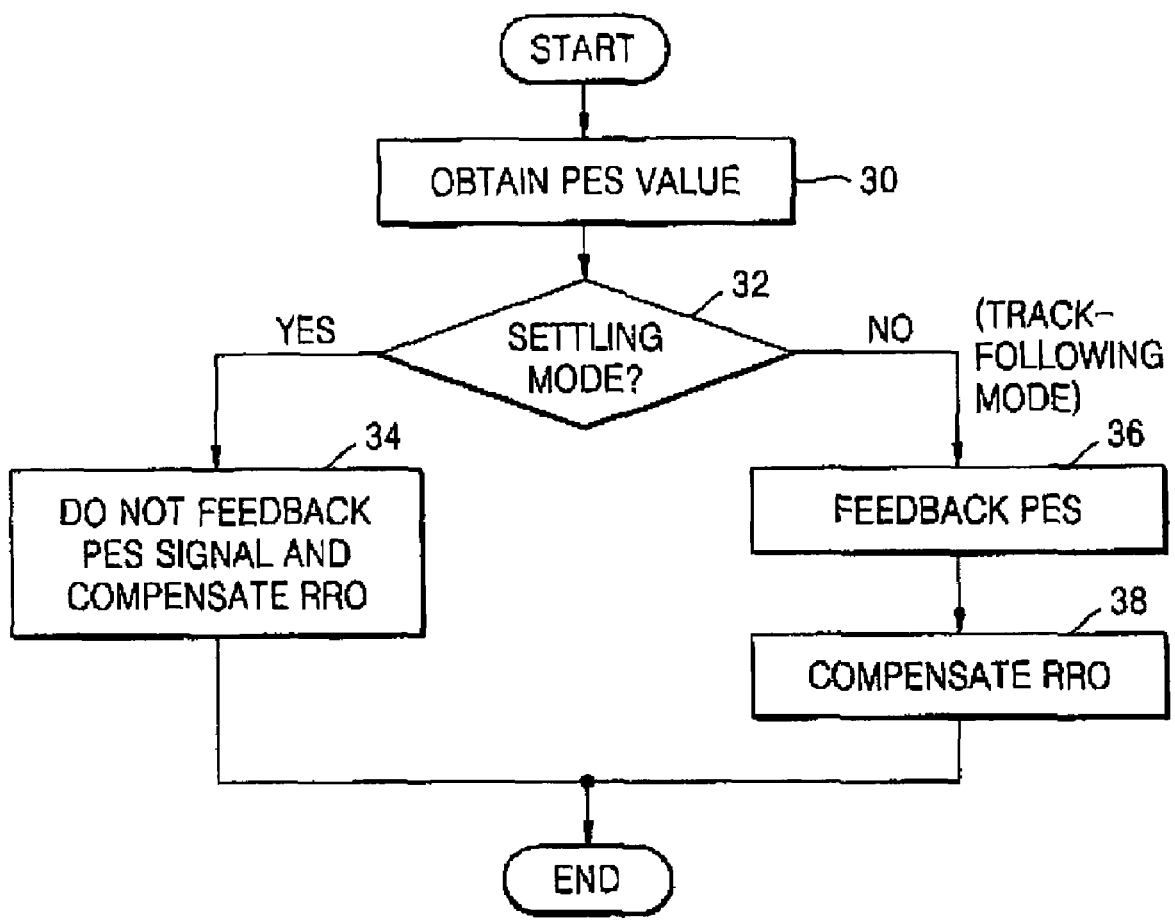
FIG. 3A is a flowchart of a method for high-speed compensation of an RRO error in a hard disk drive, according to an embodiment of the present invention.

FIG. 3A shows a flowchart of a method for high-speed compensation of an RRO error in a hard disk drive, according to the present invention. First of all, the PES value of the hard disk drive is obtained (S30). Then, it is determined whether the head of the hard disk drive is in the settling mode (S32). The determination of the settling mode may be achieved depending upon a speed and position of the head. If the head of the hard disk drive is in the settling mode, the PES is not fed back, but the RRO error is compensated (S34). If the head of the hard disk drive is in the track-following mode, the PES is fed back (S36), and the RRO error is then compensated (S38).

Figure 3B:
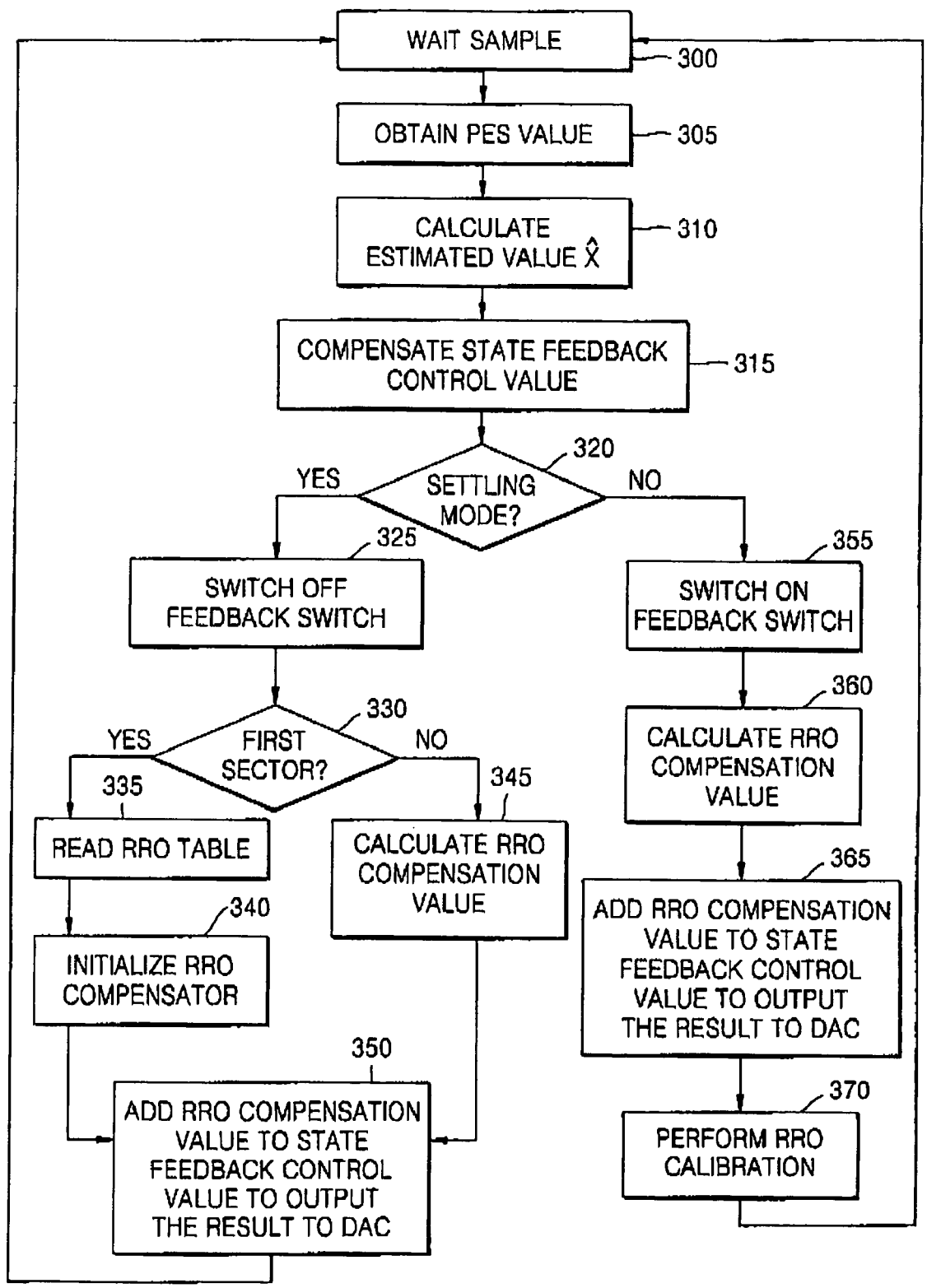
FIG. 3B is a detailed flowchart of FIG. 3A.

FIG. 3B is a detailed flowchart of FIG. 3A.

First, the controller waits for a sample (S300), and obtains the PES value from the VCM actuator 230 of the hard disk drive when the sample comes in (S305). The state estimator 250 calculates the state estimated value of the hard disk drive (S310), and the state feedback controller 240 calculates the state feedback control value (S315).

It is determined whether the head is in the settling mode (S320). If it is in the settling mode, the feedback switch 220 is switched off to check whether the servo sector is a first sector (S330).

If the servo sector is the first sector, the RRO table 200 is read (S335), and the RRO compensator 210 is initialized to calculate the RRO compensation value (S340). Since the RRO value varies with the servo sector, all RRO values of all servo sectors should be stored in a memory. In order to reduce the amount of memory for storing the RRO table, only an initial RRO value for the servo sector 0 is stored in the RRO table. When the RRO compensator 210 is initialized at the start of the settling mode, the RRO value in the remaining sector may be calculated using the initial RRO value and a trigonometric function.

If the servo sector is not the first sector, the RRO compensator 210 calculates the RRO compensation value with reference to the RRO compensation value of a previous sector (S345). Then, the RRO compensation value is added to the state feedback control value of the state feedback controller 240 and an addition result is outputted to the DAC (S350).

Meanwhile, if the disc head is not in the settling mode but in the track-following mode, the feedback switch 220 is switched on (S355). The RRO compensation value is calculated (S360), the RRO compensation value is added to the state feedback control value, and an addition is outputted to the DAC (S365), which implements the RRO calibration (S370). The term calibration refers to an entire process of initializing the RRO compensation value and operating the RRO compensator 210 to obtain a current value for compensation. In a power-on ready process performed whenever a power is applied to the hard disk drive, after waiting sufficiently for a period for the PES to converge completely to 0, each convergent value of the RRO compensators 212, 214 and 216 is measured and stored in the RRO table (power on calibration). In addition, since the RRO error may vary with the circumferences and time, the RRO calibration is achieved in a normal operation after the ready process of the hard disk drive (on-line RRO calibration). Specifically, after a predetermined period of time is elapsed after the head enters in the track-following mode, the convergent value of the compensator is stored in the RRO table.

In the case of disregarding the harmonic characteristic, a mathematical model for the voice coil motor (VCM) actuator 230 is as follows:

$$\ddot{y} = K_A(u+w)$$

Equation 4 wherein $K_A$ is an acceleration constant, variables u and w are an input current of the VCM actuator 230 and a bias error resulted from a flex cable, respectively, and a variable y is an absolute position of the VCM actuator 230. A position signal actually measured by a position sensor is not an absolute position signal, but is a relative position signal of the head with respect to the track center, which is commonly called a position error signal (PES).

Figure 4:
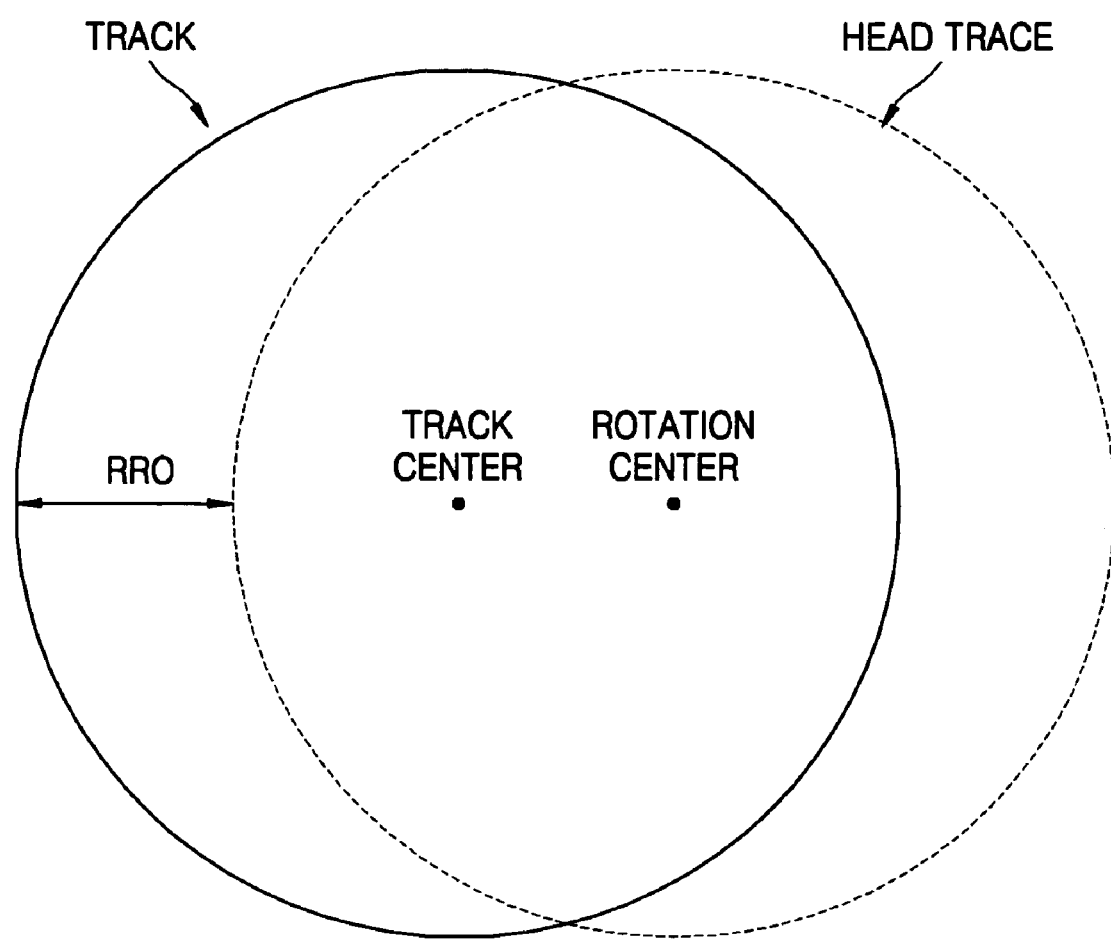
FIG. 4 is a view illustrating an RRO error due to a disk eccentricity.

When an external shock is applied to the hard disk drive, a track center of the disk is offset from a rotation center of the disk, which is referred to as the RRO error. FIG. 4 shows such an RRO error. In this case, even though the position of the VCM actuator 230 is stationary, the track center wobbles due to the RRO, so that the PES is represented as follows:

$$x = y + s$$

Equation 5 wherein variables x and s are the PES and the RRO error, respectively. The RRO error is a periodic function during a synchronous rotation of the disk, and may be regarded as a composite signal of sine waves having an integral multiple of a rotational frequency of the disk. If the PES is regarded as an output and a second derivative value of the RRO error is defined as the below Equation 6, a model of the VCM actuator 230 can be obtained as the following Equation 7:

$$d = \frac{1}{K}$$

Equation 6

$$x = K_A(u+w+d)$$

Equation 7

Consequently, the RRO error functions as an error exerting an effect upon the input terminal of the VCM actuator 230. Such an error resulted from the RRO is the second derivative value of the RRO error, and may be represented as a signal of which N harmonic are composed as the below Equation 8:

$$d(t) = d_1(t) + d_2(t) + \cdots + d_N(t)$$
$$= A_1 \sin(\omega_o t + \phi_1) +$$
$$A_2 \sin(2\omega_o t + \phi_2) + \cdots A_N \sin(N\omega_o t + \phi_N)$$

Equation 8 wherein $\omega_0$ is the rotational frequency of the disk.

To accurately control the position of the head of the hard disk drive, the head has to be quickly and precisely positioned on the center of the target track, even though an RRO error exists. Specifically, the PES must converge to 0 rapidly and precisely. To this end, the control state is generally classified into three modes: a track seeking mode, a settling mode, and a track following mode. A proper controller is used in each mode.

The track seeking mode is to quickly move the head from the current track to the vicinity of the target track, in which a trace following controller is used to follow a predetermined motion trace. The settling mode is to safely guide the head from the vicinity of the target track to the track center, in which a state feedback controller 240 is used. The track-following mode is to always position the head in the center of the target track, in which the same state feedback controller 240 as that of the settling mode is used.

When the head is closer to the target track, the RRO error as described in Equation 6 is larger and affects a control system. A larger RRO error remarkably deteriorates performances of the track-settling controller and the track-following controller, rather than that of the track-seeking controller. Consequently, an additional RRO compensator should be used in the settling mode and the track following mode, in addition to the state feedback controller 240.

First, a new RRO compensator to be used in the track following mode will now be described. The PES is discretely measured whenever the head meets servo sectors arranged at regular intervals, so that a control system of the hard disk drive performs as a discrete control system. The model of the VCM actuator 230 in Equation 7 is discretized by a zero-order hold (ZOH) model well known in the art, in view of a control delay time resulted from an operation of a digital signal processor (DSP). The result is given in Equation 9:

$$X(n+1) = AX(n) + B[u(n) + d(n)]$$

Equation 9

$$\begin{bmatrix} x(n+1) \\ v(n+1) \\ w(n+1) \\ u_d(n) \end{bmatrix} = \begin{bmatrix} 1 & T_S & K_A T_S^2/2 & K_A(T_S - T_D/2)T_D \\ 0 & 1 & K_A T_S & K_A T_D \\ 0 & 0 & 1 & 0 \\ 0 & 0 & 0 & 0 \end{bmatrix}$$

-continued $$\begin{bmatrix} x(n) \\ v(n) \\ w(n) \\ u_d(n-1) \end{bmatrix} + \begin{bmatrix} K_A(T_S - T_D)^2/2 \\ K_A(T_S - T_D) \\ 0 \\ 1 \end{bmatrix} [u(n) + d(n)]$$

wherein constants $T_s$ and $T_D$ are a sampling period and a control delay time, respectively, and $u_d$ is an auxiliary variable indicative of u+d. It is assumed that a bias error w is constant with respect to a time in a discretization operation. The bias error is varied depending upon the position of the VCM actuator 230. Since the position shift of the actuator is very minute in the settling mode and track-following mode, this assumption is valid. The state feedback controller 240 and the RRO error compensator 210 are connected in parallel to each other to control the head in the track-following mode.

$$u(n) = u_s(n) - u_c(n)$$

Equation 10 wherein $u_s$ is a control input of the state feedback, and $u_c$ is a control input for compensating the RRO error d. The state feedback controller 240 is represented in Equation 11:

$$u_s(n) = -k_x \hat{x}(n) - k_v \hat{v}(n) - \hat{w}(n) = -K_s \hat{X}(n)$$

Equation 11 wherein $K_s$ is a row vector consisting of controller gains, i.e., $[k_x, k_v, 1, 0]$, and $\hat{X}$ is a column vector consisting of estimated values of the state variable, i.e., $[\hat{x} \ \hat{v} \ \hat{w} \ \hat{u}_d]^T$. A bias estimated value $\hat{w}$ functions to compensate the bias error w which is a direct current. The state estimator 250 receives the control input us of the state feedback and the measured PES x to calculate the value $\hat{X}$, and is designed on the basis of the above Equation 9, which can be represented by Equations 12 and 13:

$$\overline{X}(n+1) = A\hat{X}(n) + Bu$$

Equation 12

$$\hat{X}(n) = \overline{X}(n) + LC[X(n) - \overline{X}]$$

Equation 13 wherein L is a column vector consisting of estimator gains, and C is a row vector [1 0 0 0].

A dynamic reaction of a closed-loop control system represented by Equations 9 through 13 will be now analyzed. First, Equation 14 is obtained from Equations 9 through 11.

$$X(n+1) = AX(n) - BK_s \hat{X}(n) + B[-u_c(n) + d]$$

Equation 14

Then, Equation 15 is obtained by subtracting Equation 12 from Equation 9.

$$X(n+1) - \overline{X}(n+1) = A[X(n) - \hat{X}(n)] + B[-u_c(n) + d]$$

Equation 15

Equation 13 can be represented as follows:

$$X(n) - \hat{X}(n) = (I - LC)[X(n) - \overline{X}]$$

Equation 16 wherein I is a unit matrix. The state estimated error $\tilde{X}$ is defined by Equation 17, and by combining Equations 14 through 16, a dynamic equation determining the reaction of the closed-loop control system is represented as in Equation 18:

$$\tilde{X}(n) = X(n) - \hat{X}(n)$$

Equation 17

$$X(n+1) = AX(n) + BK_s[\tilde{X}(n) - X(n)] + B[-u_c(n) + d(n)]$$

$$\tilde{X}(n+1) = (I - LC)A\tilde{X}(n) + (I - LC)B[-u_c(n) + d(n)]$$

Equation 18

It can be predicted from the above equation that if the RRO compensator is not used, i.e., $u_c(n) = 0$, the PES and the state estimated error $\bar{X}$ do not converge to 0, because of the RRO error, so the head wobbles.

The design of the RRO compensator 210 will now be described. The RRO error is represented by adding N sine waves, as shown in Equation 8. Therefore, the RRO compensator 210 consists of N compensators connected in parallel.

$$u_c(n) = r_{a,1}(n) + r_{a,2}(n) + \ldots + r_{a,N}(n) \qquad \text{Equation 19}$$

wherein $r_{a,k}$ is a signal to compensate a $k^{th}$ harmonic component of the RRO error, and is calculated from the measured PES x on the basis of a quadratic static equation as shown in Equation 20:

$$\begin{bmatrix} r_{a,k}(n+1) \\ r_{b,k}(n+1) \end{bmatrix} = \begin{bmatrix} \cos(k\omega_o T_S) & -\sin(k\omega_o T_S) \\ \sin(k\omega_o T_S) & \cos(k\omega_o T_S) \end{bmatrix} \qquad \text{Equation 20}$$

$$\begin{bmatrix} r_{a,k}(n) \\ r_{b,k}(n) \end{bmatrix} + \begin{bmatrix} a_k \\ b_k \end{bmatrix} x(n), k = 1, 2, \cdots, N$$

wherein constants $a_k$ and $b_k$ are control gains of a $k^{th}$ compensator, respectively. In order to verify a compensating performance of the compensator, a transfer function of the RRO compensator 210 is as follows:

$$H_k(z) = \qquad \text{Equation 21}$$

$$\frac{r_{a,k}(z)}{x(z)} = \frac{a_k z - a_k \cos(k\omega_o T_S) - b_k \sin(k\omega_o T_S)}{z^2 - 2\cos(k\omega_o T_S)z + 1},$$

$$k = 1, 2, \cdots, N$$

A pole of the transfer function is $e^{\pm j k \omega_e T_S}$. Consequently, the pole $e^{\pm j k \omega_e T_S}$ is zero between a $k^{th}$ error $d_k$ and the PES x. According to equation 18, in a normal state, the PES and the state estimated error $\hat{X}$ converge to 0, the compensation signal $r_{a,k}$ converges to $d_k$, and $u_c$ is converged to the error signal d.

$$\lim_{n \to \infty} x(n) = 0, \qquad \text{Equation 22}$$

$$\lim_{n \to \infty} \tilde{X}(n) = 0,$$

$$\lim_{n \to \infty} r_{a,k}(n) = d_k(n),$$

$$\lim_{n \to \infty} u_c(n) = d(n)$$

Figure 5:
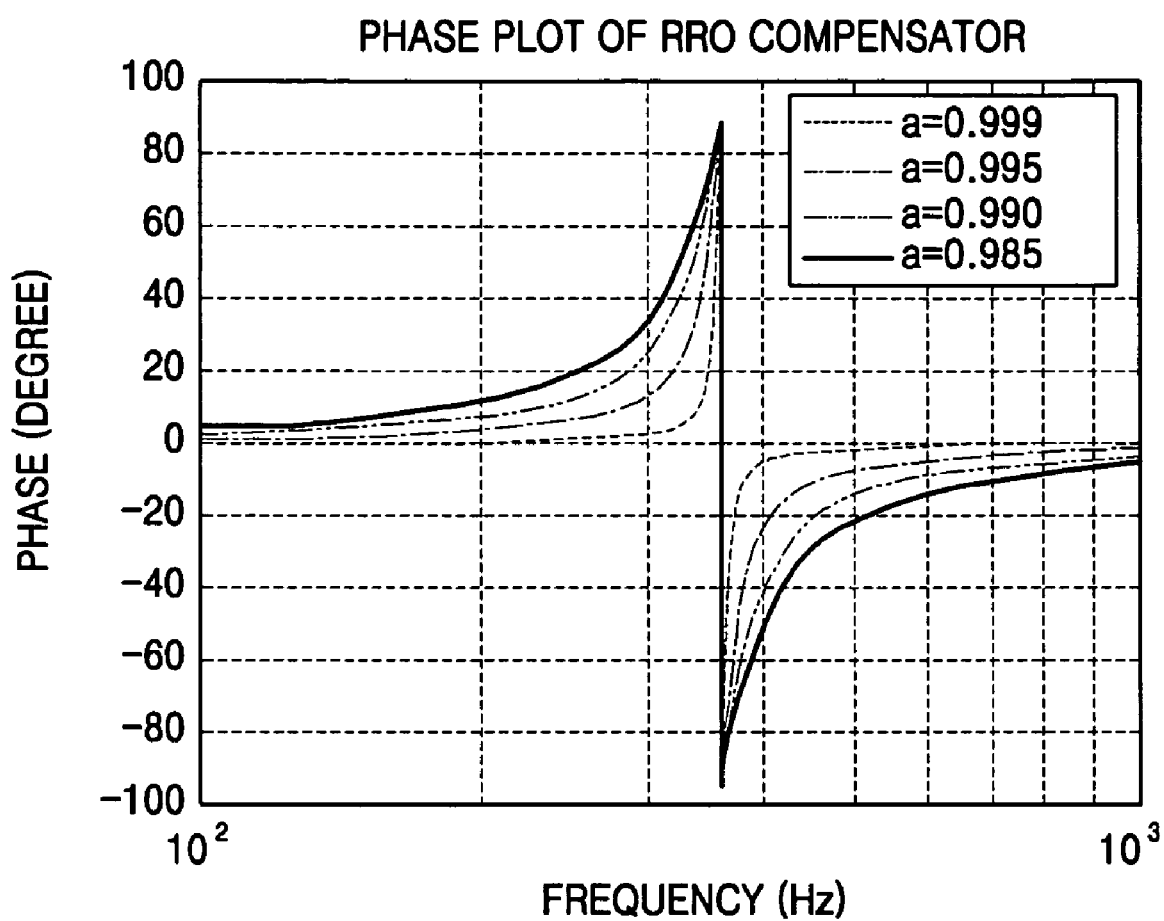
FIG. 5 is a view illustrating a frequency phase response characteristic of an RRO compensator of a serial form.

A method of setting the compensator gain will now be described. Since the compensator exerts a large influence upon a stability of the control system, the compensator gain should be properly selected. When the compensators are connected in parallel, it is very difficult to set the gain in view of stability since the relation between the gain and the stability is very complicated. Meanwhile, when the compensators are connected in series, the control gain can be easily determined since the stability is easily calculated. Consequently, the present invention employs the method of placing the compensators in serial, setting the control gain, and changing the compensator from being in series into parallel. The transfer function of the compensator composed in series is as follows:

$$H_{s,k}(z) = \frac{z^2 - 2a_k \cos(k\theta)z + a_k^2}{z^2 - 2\cos(k\theta)z + 1}, k = 1, 2, \cdots, N \qquad \text{Equation 23}$$

wherein $a_k$ is a control gain, and has a value between 0 and 1. Generally, $a_k$ is a value close to 1. An example of a phase response characteristic is shown in FIG. 5. Referring to FIG. 5, as the control gain moves away from 1, the phase is reduced, and the stability of the control system deteriorates more. When the compensators are connected in series, an open-loop transfer function of the control system is as follows:

$$H_S(z) = \qquad \text{Equation 24}$$

$$C(z) \left( \frac{z^2 - 2a_1 \cos(\theta)z + a_1^2}{z^2 - 2\cos(\theta)z + 1} \right) \left( \frac{z^2 - 2a_2 \cos(2\theta)z + a_2^2}{z^2 - 2\cos(2\theta)z + 1} \right)$$

$$\cdots \left( \frac{z^2 - 2a_N \cos(N\theta)z + a_N^2}{z^2 - 2\cos(N\theta)z + 1} \right)$$

wherein C(z) is an equivalent transfer function of the controller when the state estimator and the state feedback are combined. Since the total phase reduction by N compensators is the sum of the phase reduction in the respective compensators, if the allowable maximum phase reduction is determined, it is possible to easily select each control gain $\alpha_k$. The transfer function after changing the compensators from being in series to parallel is as follows:

$$H_P(z) = C'(z) + \frac{\alpha_1 z + \beta_1}{z^2 - 2\cos(\theta)z + 1} + \qquad \text{Equation 25}$$

$$\frac{\alpha_2 z + \beta_2}{z^2 - 2\cos(2\theta)z + 1} + \cdots + \frac{\alpha_N z + \beta_N}{z^2 - 2\cos(N\theta)z + 1}$$

In this case, two control gains $\alpha_k$ and $\beta_k$ are set for each compensator. These control gains may be selected as shown below in Equation 26:

$$\alpha_k = \frac{\text{Im}\{F_k(e^{jk\theta})\}}{\sin(k\theta)}, \beta_k = \text{Re}\{F_k(e^{jk\theta})\} - \alpha_k \cos(k\theta) \qquad \text{Equation 26}$$

wherein function $F_k$ is defined the follows:

$$F_k(z) = (z^2 - 2\cos(k\theta)z + 1) H_s(z) \qquad \text{Equation 27}$$

Finally, the control gain is calculated from Equation 21 as the follows:

$$a_k = \alpha_k, b_k = \frac{-\alpha_k \cos(k\theta) - \beta_k}{\sin(k\theta)} \qquad \text{Equation 28}$$

Figure 6:
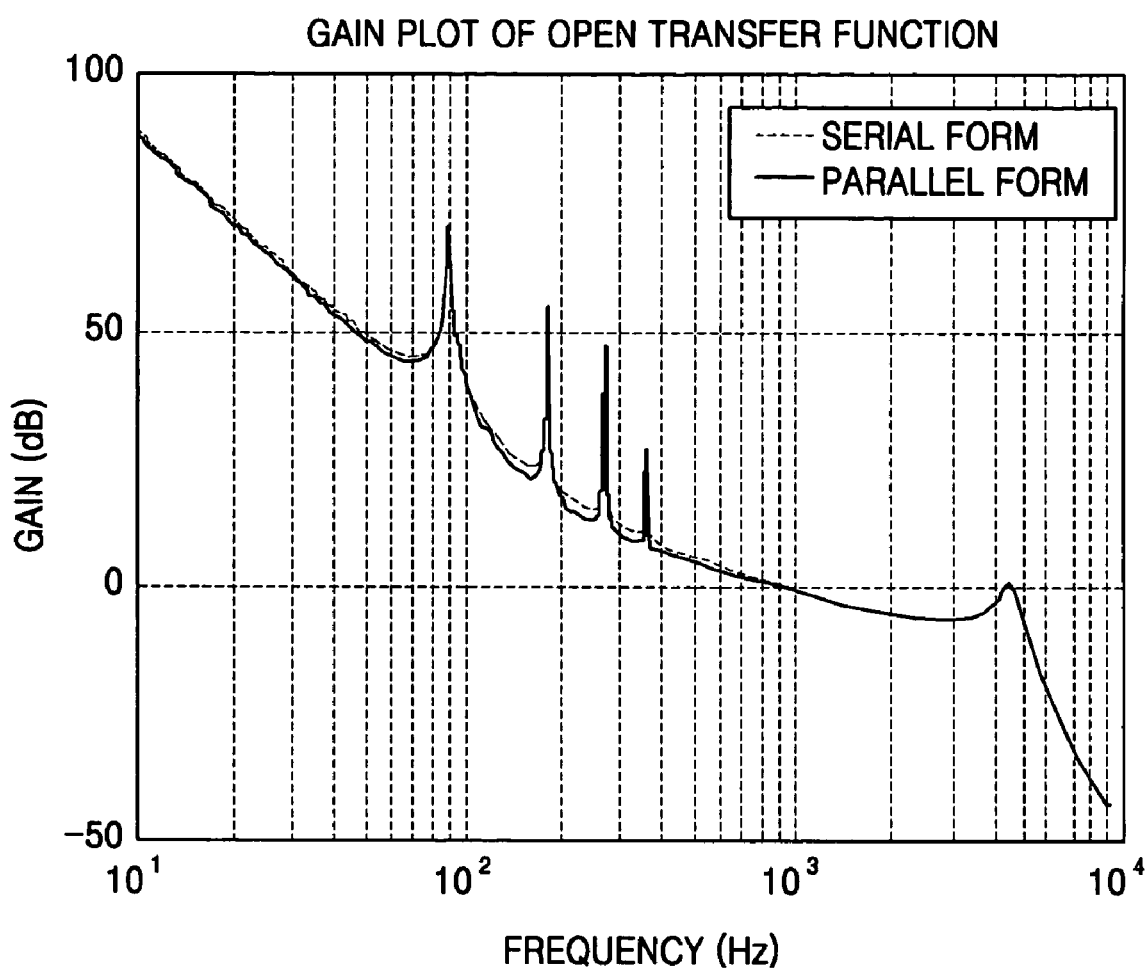
FIG. 6 is a view illustrating a frequency gain response characteristic of an open-loop system in the case of using an RRO compensator.

Although C(z) in equation 24 does not precisely correspond to C'(z) in equation 25, it is assumed that they correspond to each other. FIG. 6 is a graph showing gains of the transfer functions $H_s(z)$ and $H_p(z)$ when coefficients C(z) and C'(z) are equal to each other and four compensators are used. It is apparent that the gains are approximately equal to each other.

The construction of the RRO compensator 210 to be used in the settling mode will now be described. Since the settling mode starts operating when the PES is high, if the RRO compensator 210 for the track following mode modeled as shown in Equation 20 is used, there is a problem in that a convergence speed of the RRO compensator 210 is very slow due to mutual interference with the state feedback controller 240. In order to solve this above problem, it has been proposed a scheme of initializing the RRO compensator 210 to a normal state value previously measured. However, since the interference with the state feedback controller 240 still exists, the problem is not basically solved. This fact will be apparently shown in a test of the present invention. To exclude the mutual interference, the PES trace is eliminated from Equation 20:

$$\begin{bmatrix} r_{a,k}(n+1) \\ r_{b,k}(n+1) \end{bmatrix} = \begin{bmatrix} \cos(k\omega_o T_s) & -\sin(k\omega_o T_s) \\ \sin(k\omega_o T_s) & \cos(k\omega_o T_s) \end{bmatrix} \begin{bmatrix} r_{a,k}(n) \\ r_{b,k}(n) \end{bmatrix},$$
$$k = 1, 2, \ldots, N$$

Equation 29

In this case, RRO compensator 210 independently operates without the PES trace, different from the RRO compensator 210 in the track following mode, so that the mutual interference with the state feedback controller 240 will be completely eliminated. The RRO compensator 210 functions to generate the sine wave by itself, amplitude and phase of which are determined by an initial value of state variables $r_{a,k}$ and $r_{b,k}$. Consequently, if the state variables $r_{a,k}$ and $r_{b,k}$ are properly initialized to eliminate the RRO error $d_k$ when the RRO compensator 210 in Equation 29 starts operating, the RRO error is compensated. In the power-on mode, the RRO compensator 210 in the track-following mode as in Equation 20 is used. After sufficiently waiting for a period for the PES to converge completely to 0, the convergent values $r^*_{a,k}$ and $r^*_{b,k}$ of the RRO compensator 210 are measured to obtain the initialization values of the RRO compensator 210. Since the initialization values vary with the servo sector, it is difficult to store the values of all servo sectors in the memory. If only an initialization value for sector number 0 is stored, the initialization values of the remaining sector may be calculated as follows:

$$\begin{bmatrix} r^*_{a,k}(m) \\ r^*_{b,k}(m) \end{bmatrix} = \begin{bmatrix} \cos(km\omega_o T_s) & -\sin(km\omega_o T_s) \\ \sin(km\omega_o T_s) & \cos(km\omega_o T_s) \end{bmatrix} \begin{bmatrix} r^*_{a,k}(0) \\ r^*_{b,k}(0) \end{bmatrix},$$
$$k = 1, 2, \ldots, N$$

Equation 30 wherein $r^*_{a,k}(m)$ and $r^*_{b,k}(m)$ are initialization values for a sector m, and $r^*_{a,k}(0)$ and $r^*_{b,k}(0)$ are initialization values for a sector 0. Since the amplitude and phase of the RRO error may vary with the radius of the disk and time, the measurement of the initialization value of the RRO compensator 210 should be continuously implemented during a normal operation, after the ready process of the hard disk drive. In other words, after entering in the track-following mode, whenever the head is on the 0 servo sector, the value of the RRO compensator 210 should be stored in the RRO table.

As described above, if the RRO compensator 210 in Equation 29 is initialized to the value obtained by Equation 30, the RRO error is directly compensated, without the interference with the state feedback controller 240. In other words, for $u_c = d$, the dynamic equation of the closed-loop control system is as follows:

$$X(n+1) = AX(n) + BK_s[\tilde{X}(n) - X(n)]$$

$$\tilde{X}(n+1) + (I - LC)A\tilde{X}(n)$$

Equation 31

In addition, in Equation 31, the gain L of the state estimator 250 is designed such that the pole of matrix (I−LC)A of the state estimator 250 is sufficiently fast. Therefore, the dynamic equation of the closed-loop system can be simplified as follows:

$$X(n+1) = (A - BK_s)X(n)$$

Equation 32

Finally, the response of the system in the settling mode is not affected by the RRO error, and is determined based on the initial conditions of the pole of the matrix $A-BK_s$ of the system and the vector x. If the settling mode starts when the initial value is high, an overshoot occurs, thereby deteriorating the performance of the settling control.

The present invention may be embodied as a computer-readable code on a computer-readable medium. The computer-readable recording medium includes all kinds of recording device in which data readable by computer system is stored. An example of the computer-readable recording device includes ROM, RAM, CD-ROM, a magnetic tape, a floppy disk, an optical data storage device, and the like.

According to the method and apparatus for high-speed compensation of an RRO error in the hard disk drive, the present invention can compensate excessive RRO error with high speed. Consequently, even though the hard disk drive is applied with the external shock or is assembled in an offline servo writing manner to excessively generate the RRO, the performance of the hard disk drive is not deteriorated.

Figure 7:
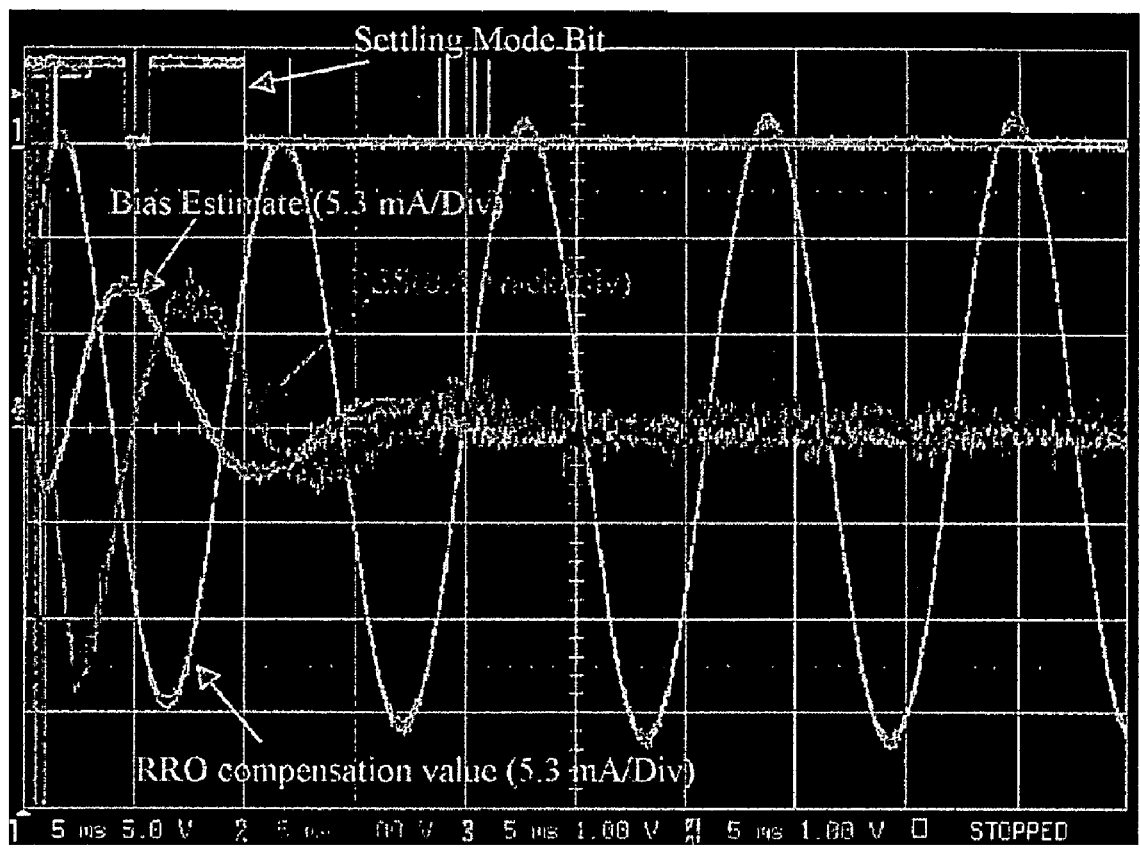
FIG. 7 is a view illustrating a system response in the case of using a conventional RRO compensator (initial value=0)
Figure 8:
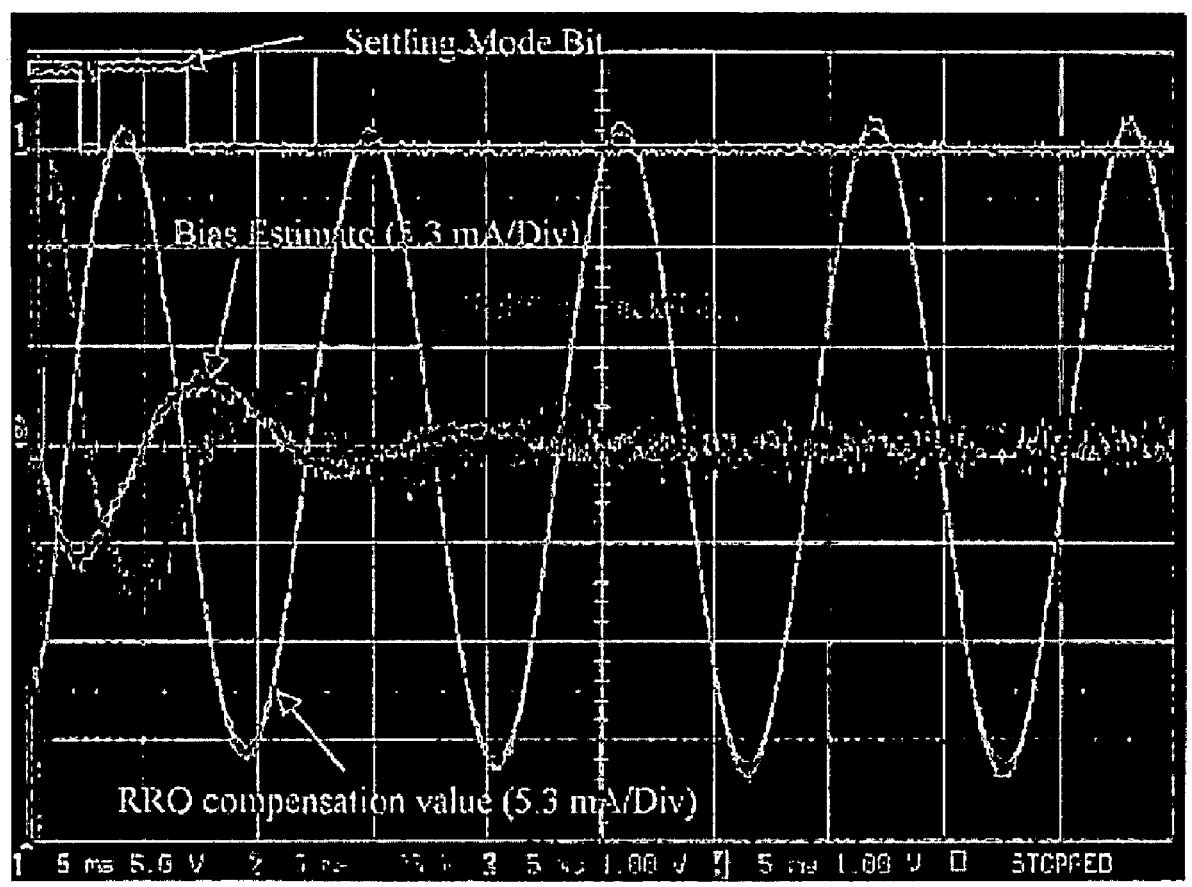
FIG. 8 is a view illustrating a system response in the case of using a conventional RRO compensator (initial value=RRO table)
Figure 9:
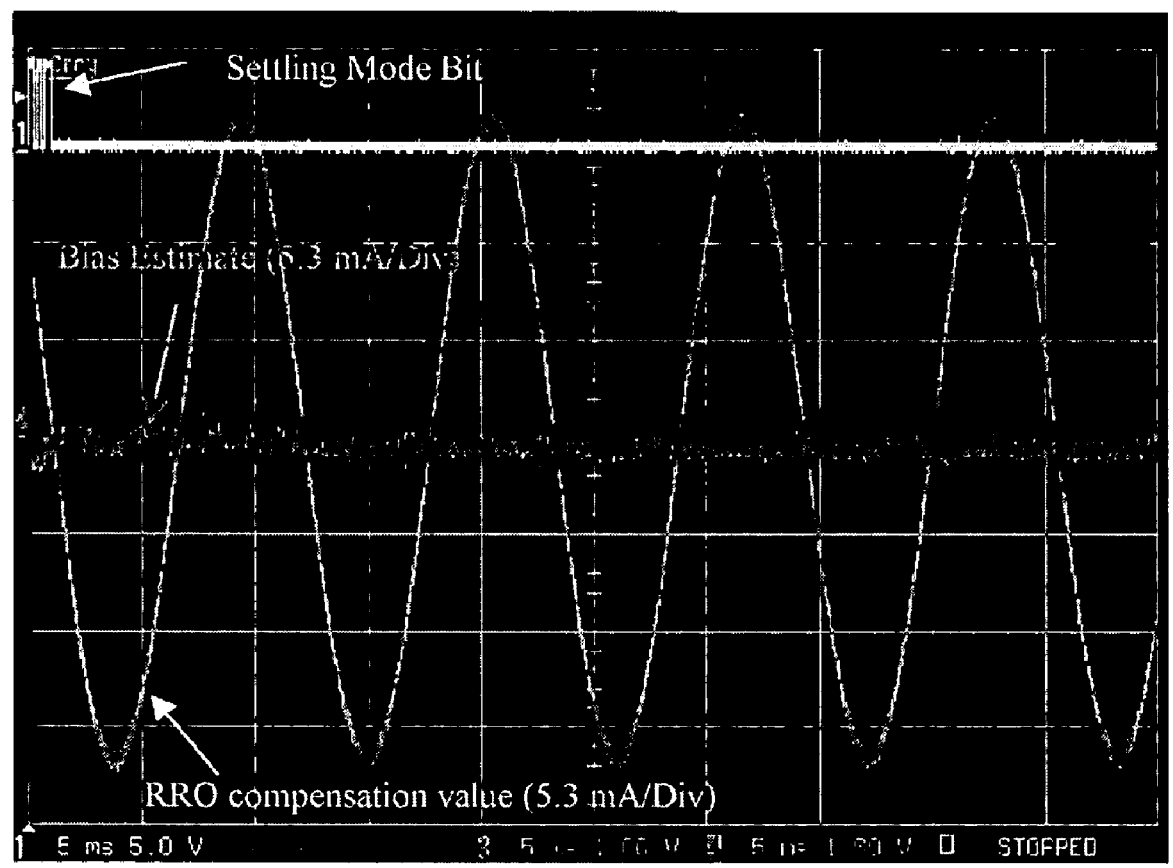
FIG. 9 is a view illustrating a system response in the case of using a RRO compensator of the present invention.
Figure 10:
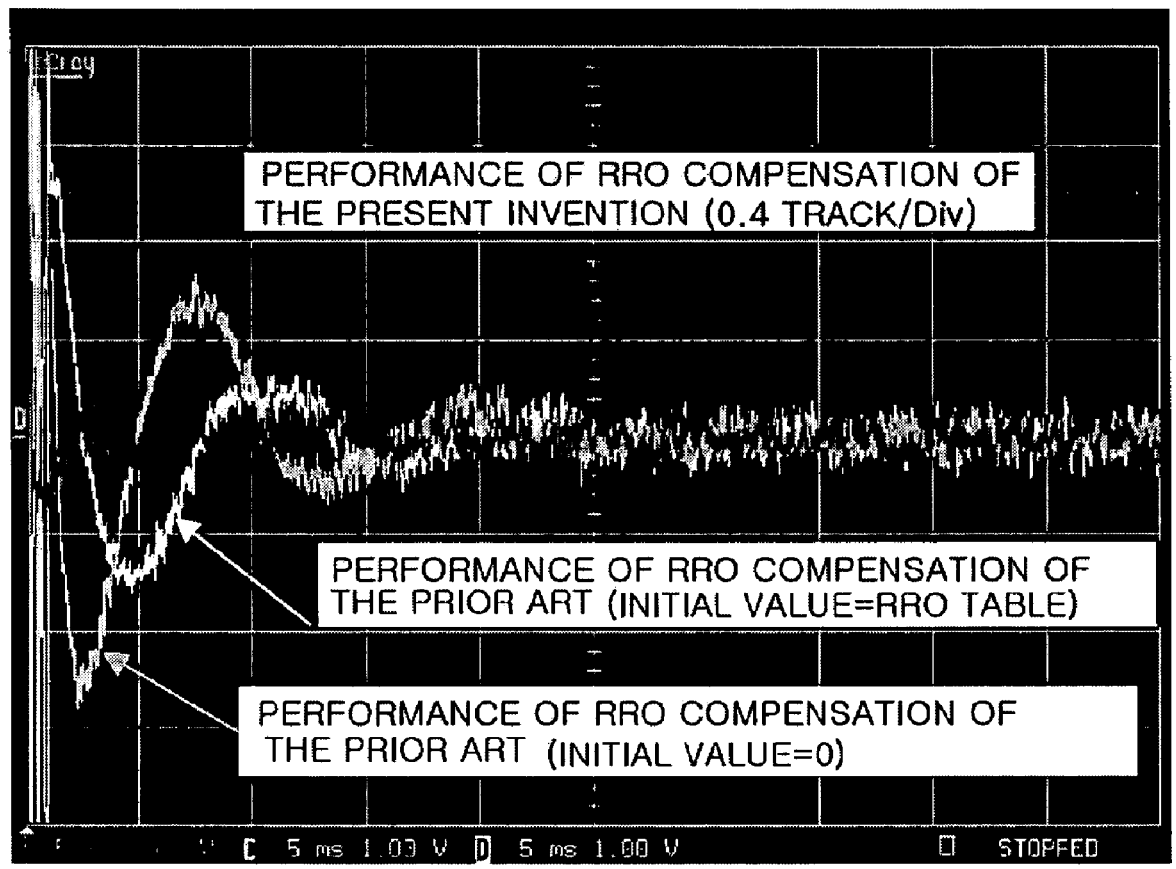
FIG. 10 is a view illustrating RRO compensation results of the present invention and the prior art.
Figure 11:
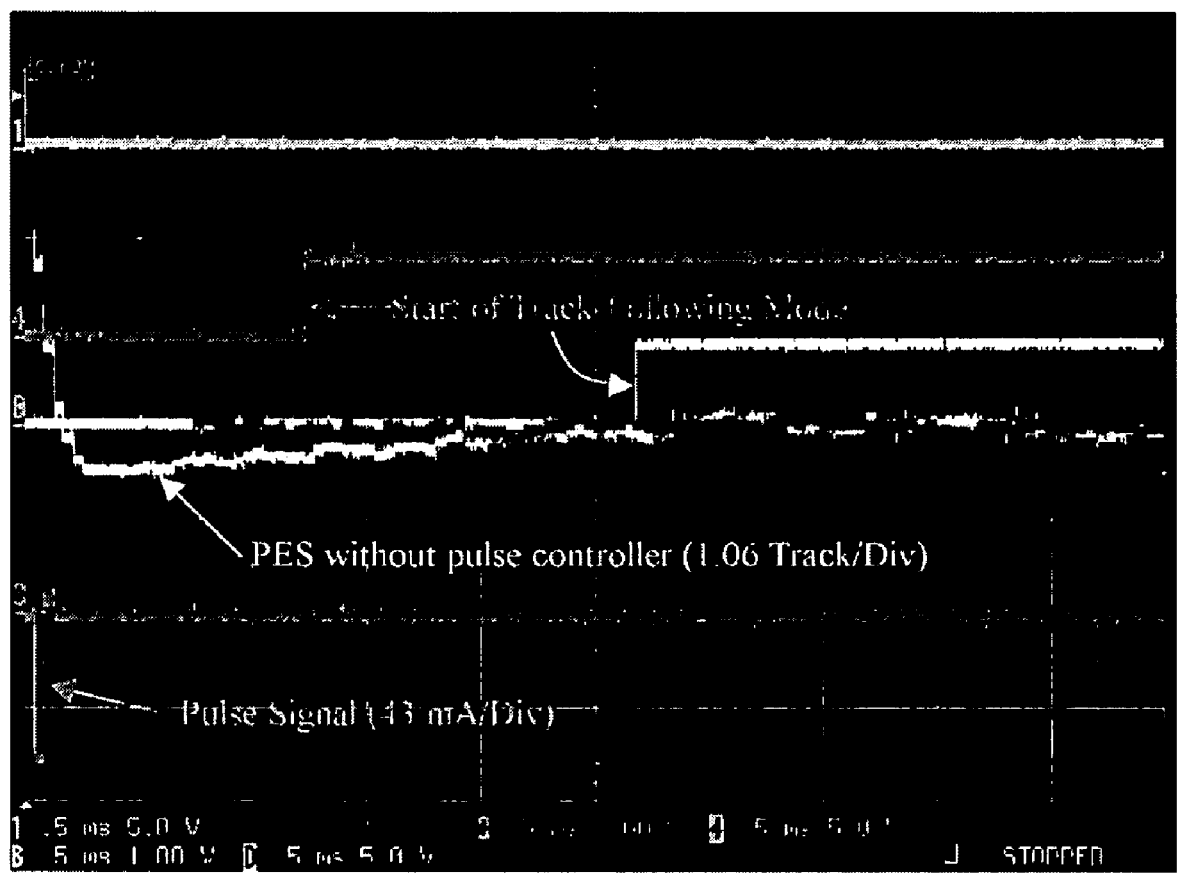
FIG. 11 is an enlarged view of the response of the PES in FIG. 9, in which an small overshoot is generated when the compensator enters in the track-following mode.

The present invention was tested to prove the above effects. The hard disk drive used in the test was a high-density hard disk drive with a storage capacity of 80 GByte per disk, of which a track density is 93,000 TPI and a track width is 0.27 µm. The first harmonic RRO of 200 tracks was applied to the control system as the error, the RRO compensator started at a point where a head is apart from a target track by 6 tracks. FIGS. 7 and 8 show a PES, a bias estimated value and a response of a conventional RRO compensator. FIG. 7 shows the case where the conventional RRO compensator starts from zero, and FIG. 8 shows the case where the conventional RRO compensator is first initialized to a value of an RRO table and then starts operating. In both cases, because of the mutual interference with a state feedback control input, the compensator vibrates excessively. Consequently, more than the minimum 20 msec were required to enter in the track following mode, which shows a remarkable deterioration of the performance of the hard disk drive. FIG. 9 shows the case where the RRO compensator of the present invention is used. It is apparent that the RRO error is compensated and the hard disk drive enters in the track-following mode within 2 msec. Accordingly, even though there is the RRO of 200 tracks, the performance of the hard disk drive is never deteriorated. FIG. 10 shows only a relative response of PES in three cases. FIG. 11 is an enlarged view of the response of the PES in FIG. 9, in which a small overshoot is generated when the compensator enters in the track-following mode. In order to solve the above problem, as shown in FIG. 11, two pulses are additionally applied to the system when the settling mode begins to eliminate two poles. In this case, the compensator enters in the track-following mode without generating the overshoot, thereby improving the performance of the settling control above 1 msec.

While the present invention has been particularly shown and described with reference to exemplary embodiments depicted in the drawings, it will be understood by those of ordinary skill in the art that various changes and modifications in form and details may be made therein without departing from the spirit and scope of the present invention.

Therefore, the true spirit and scope for protection of the present invention will be defined by the following claims.

What is claimed is:

1. A method for high-speed compensation of a repeatable run-out (RRO) error in a hard disk drive, in which a head position control of the hard disk drive includes a track seeking mode where a head is moved from a current track to a vicinity of a target track, a settling mode where the head is safely guided from the vicinity of the target track to a track center, and a track-following mode where the head is maintained at a center of the target track, the method comprising:

a) obtaining a value of a position error signal (PES) of the hard disk drive, the PES being a relative position signal of the head with respect to the center of the target track of a disk;

b) determining whether the head is in the settling mode;

c) if the head is in the settling mode, compensating the RRO error without feeding back the PES; and d) if the head is in the track-following mode, compensating the RRO error by feeding back the PBS.

2. The method of claim 1, wherein the operation b) comprises:

calculating an estimated state value of the hard disk drive;

calculating a state feedback control value using the estimated state value; and determining whether the head is in the settling mode using the state feedback control value.

3. A computer-readable storage medium having recorded thereon a computer program for executing a method according to claim 2.

4. A computer-readable storage medium having recorded thereon a computer program for executing a method according to claim 1.

5. The method of claim 1, wherein the operation c) comprises:

if the head is in the settling mode, determining whether a servo sector is a first sector;

if the servo sector is the first sector, initializing an RRO compensation value of the first sector to an initial RRO value in an RRO table of the servo sector and calculating an RRO compensation value of another sector;

if the servo sector is not the first sector, calculating an RRO compensation value of the servo sector with reference to an RRO compensation value of a previous sector; and adding the RRO compensation value of the first sector or the RRO compensation value of the servo sector to a state feedback control value to generate an addition result and outputting the addition result to a digital to analog converter (DAC).

6. The method of claim 1, wherein the operation d) comprises:

if the head is in the track-following mode, feeding back the PES;

calculating an RRO compensation value;

adding the RRO compensation value to a state feedback control value to generate an addition result and outputting the addition result to a digital to analog converter (DAC); and performing RRO calibration.

7. A method for high-speed compensation of a repeatable run-out (RRO) error in a hard disk drive, in which a head position control of the hard disk drive includes a track seeking mode, a settling mode, and a track-following mode, the method comprising:

a) obtaining a value of a position error signal (PBS) of the hard disk drive, the PBS being a relative position signal of a head with respect to a center of a target track of a disk;

b) determining whether the head is in the settling mode;

c) if the head is in the settling mode, determining whether a servo sector is a first sector;

if the servo sector is the first sector, initializing an RRO compensation value of the first sector to an initial RRO value in an RRO table of the servo sector and calculating an RRO compensation value of another sector without feeding back the PBS;

if the servo sector is not the first sector, calculating an RRO compensation value of the servo sector with reference to an RRO compensation value of a previous sector without feeding back the PBS; and adding the RRO compensation value of the first sector or the RRO compensation value of the servo sector to a state feedback control value to generate an addition result and outputting the addition result to a digital to analog converter and d) if the head is in the track-following mode, compensating the RRO error by feeding back the PES.

8. A computer-readable storage medium having recorded thereon a computer program for executing a method according to claim 3.

9. A method for high-speed compensation of a repeatable run-out (RRO) error in a hard disk drive, in which a head position control of the hard disk drive includes a track seeking mode, a settling mode, and a track-following mode, the method comprising:

a) obtaining a value of a position error signal (PBS) of the hard disk drive, the PES being a relative position signal of a head with respect to a center of a target track of a disk;

b) determining whether the head is in the settling mode;

c) if the head is in the settling mode, compensating the RRO error without feeding back the PES: and d) if the head is in the track-following mode, feeding back the PBS;

calculating an RRO compensation value;

adding the RRO compensation value to a state feedback control value to generate an addition result and outputting the addition result to a digital to analog converter (DAC); and performing RRO calibration.

10. A computer-readable storage medium having recorded thereon a computer program for executing a method according to claim 4.

11. An apparatus for high-speed compensation of a repeatable run-out (RRO) error in a hard disk drive, in which a head position control of the hard disk drive includes a track seeking mode where a head is moved from a current track to a vicinity of a target track, a settling mode where the head is safely guided from the vicinity of the target track to a track center, and a track-following mode where the head is maintained to be located at a center of the target track, the apparatus comprising:

an RRO table that stores RRO compensation values of servo sectors of a disk;

a VCM actuator that controls a position of the head, and outputting a position error signal (PBS) using a difference between a state feedback control signal of a state feedback controller and an RRO compensation value of an RRO compensator; and a feedback switch that prevents the PBS outputted from the VCM actuator from being inputted to the RRO compensator in the settling mode and the track seeking mode and for inputting the PBS to the RRO compensator in the track-following mode; wherein the RRO compensator receives the PES controlled by the feedback switch with reference to an Initial RRO compensation value in the RRO table, to compensate the RRO error;

the state feedback controller outputs the state feedback control value in accordance with a state of the hard disk drive that is estimated by a state estimator; and the state estimator receives the state feedback control value of the state feedback controller and the PES of the VCM actuator to estimate the state of the hard disk drive.

12. The apparatus of claim 11, wherein the RRO compensator is a plurality of RRO compensators, the plurality of RRO compensators receive the PBS controlled by the feedback switch with reference to the Initial RRO compensation value in the RRO table to compensate the RRO error comprising a number of harmonics, and the plurality of PRO compensators are provided to compensate each of the number of RRO harmonics.

13. The apparatus of claim 11, wherein the RRO compensator starts operating in the settling mode, and is initialized to a value stored in the RRO table to compensate the RRO error.

14. The apparatus of claim 11, wherein in a power-on mode, after a period for the PES to converge completely to a predetermined value, the RRO compensator measures each convergent value of the RRO compensator and stores each convergent value in the RRO table, and carries out a calibration even in a normal operation after a ready process of the hard disk drive.

15. An apparatus for high-speed compensation of a repeatable run-out (RRO) error in a hard disk drive, in which a head position control of the hard disk drive includes a track seeking mode, a settling mode, and a track-following mode, the apparatus comprising:

an RRO table that stores RRO compensation values of servo sectors of a disk;

a VCM actuator that controls a position of a head, and outputs a position error signal (PBS) using a difference between a state feedback control signal of a state feedback controller and an RRO compensation value of an RRO compensator; and a feedback switch that prevents the PES from being inputted to the RRO compensator in the settling mode and the track seeking mode and for inputting the PES to the RRO compensator in the track-following mode; wherein the RRO compensator receives the PBS controlled by the feedback switch with reference to an initial RRO compensation value in the RRO table, to compensate the RRO error;

the state feedback controller outputs the state feedback control value in accordance with a state of the hard disk drive estimated by a state estimator; and the state estimator receives the state feedback control value and the PBS to estimate the state of the hard disk drive, wherein in a power-on mode, after a period for the PBS to converge completely to a predetermined value, the RRO compensator measures each convergent value of the RRO compensator and stores each convergent value in the RRO table, and carries out a calibration even in a normal operation after a ready process of the hard disk drive.

16. An apparatus for high-speed compensation of a repeatable run-out (RRO) error in a hard disk drive, in which a head position control of the hard disk drive includes a track seeking mode, a settling mode, and a track-following mode, the apparatus comprising:

an RRO table that stores RRO compensation values of servo sectors of a disk;

a VCM actuator that controls a position of a head, and outputs a position error signal (PES) using a difference between a state feedback control signal of a state feedback controller and an RRO compensation value of an RRO compensator, wherein the RRO compensator is a plurality of RRO compensators connected in parallel, the plurality of RRO compensators receiving the PES controlled by the feedback switch with reference to the initial RRO compensation value in the RRO table to compensate the RRO error comprising a number of harmonics, and the plurality of RRO compensators are provided to compensate each of the number of RRO harmonics.

17. The apparatus of claim 16, wherein a gain of each of the plurality of RRO compensators connected in parallel is obtained by using a transfer function for the plurality of RRO compensators connected in series and transforming said transfer function to a transfer function for the plurality of RRO compensators connected in parallel.

* * * * *